United States Patent [19]

Ono et al.

[11] Patent Number: 5,769,618
[45] Date of Patent: Jun. 23, 1998

[54] UNIAXIAL ECCENTRIC SCREW PUMP HAVING A FLEXIBLE PLASTIC SHAFT

[75] Inventors: Sumio Ono, Ashiya; Mikio Yamashita, Kobe; Eiji Hayashi, Ika-gun, all of Japan

[73] Assignee: Heishin Sobi Kabushiki Kaisha, Kobe, Japan

[21] Appl. No.: 711,800

[22] Filed: Sep. 10, 1996

[30] Foreign Application Priority Data

Sep. 25, 1995 [JP] Japan .................................. 7-271988
Jan. 24, 1996 [JP] Japan .................................. 8-009850

[51] Int. Cl.$^6$ ............................. F04C 2/107; F04C 5/00
[52] U.S. Cl. ............................................ 418/48; 418/182
[58] Field of Search ........................................ 418/48, 182

[56] References Cited

U.S. PATENT DOCUMENTS 2,621,605 12/1952 Mark, Jr. .................................... 418/48
4,153,397 5/1979 Allen ........................................ 418/48
5,108,273 4/1992 Romanyszyn, Jr. ...................... 418/48

FOREIGN PATENT DOCUMENTS 2340777 2/1975 German Dem. Rep. ................. 418/48

*Primary Examiner*—John J. Vrablik
*Attorney, Agent, or Firm*—Marshall, O'Toole, Gerstein, Murray & Borun

[57] ABSTRACT

This disclosure relates to a uniaxial eccentric screw pump. A boss 10a is integrally formed on one end (on the side of a pump casing 8) of the rotor 10, the screw pump 100, and one end of a flexible shaft 9 is inserted in the boss 10a and bonded together with the rotor 10 integrally by means of an adhesive. The flexible shaft 9 is made at least in part from a rod-like member which is extruded from PEEK (polyetheretherketone) which is one of the engineering plastics, into a cylinder. A metal rod 17 is provided in the middle of the flexible shaft in the longitudinal direction, or a metal sleeve is mounted over the outer circumference of the flexible shaft.

30 Claims, 10 Drawing Sheets

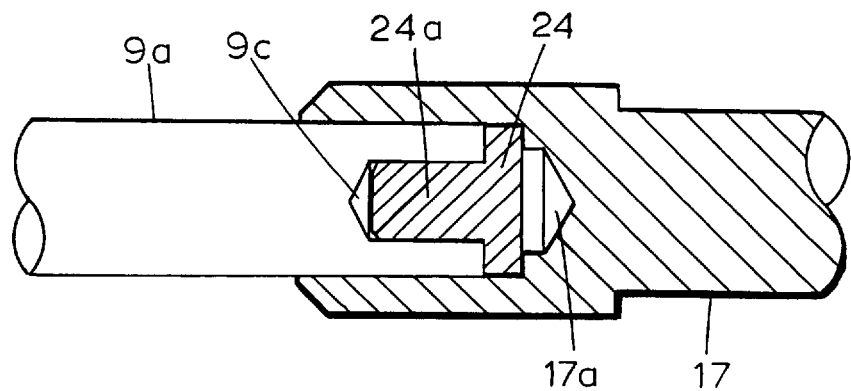
Fig. 8A
Fig. 8B
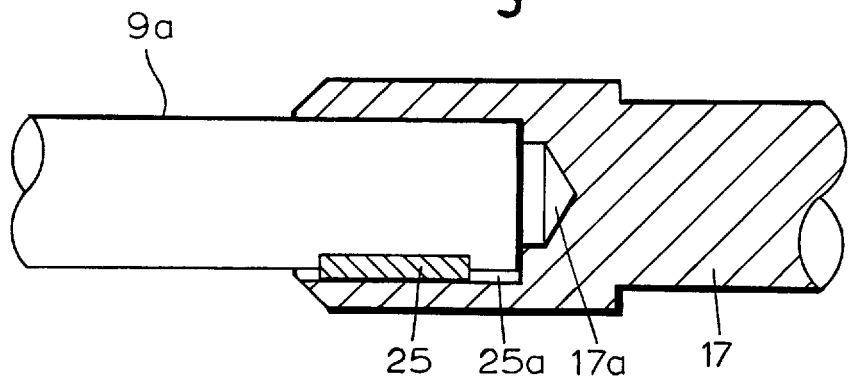
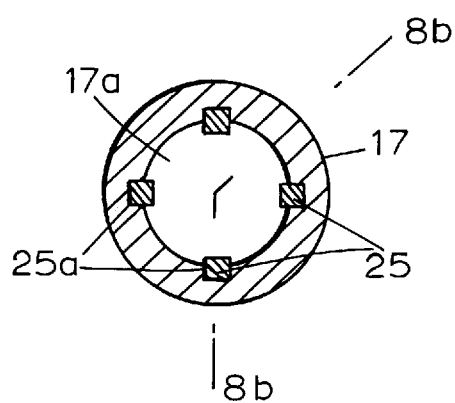
Fig. 8C

UNIAXIAL ECCENTRIC SCREW PUMP HAVING A FLEXIBLE PLASTIC SHAFT

FIELD AND BACKGROUND OF THE INVENTION

The present invention relates to a uniaxial eccentric screw pump for transferring various materials, such as liquid chemicals, liquid containing solids, slurries and highly viscous liquids, and more particularly, to such a screw pump including a flexible shaft or flexible rod for connecting the driving shaft of a drive unit with an external thread type rotor.

As shown in FIG. 10, a conventional uniaxial eccentric screw pump 31, as is known well, includes an external thread screw-type rotor 35 which is connected, via a metal connecting rod 34, to the driving shaft 33 of a drive unit (not shown). The rotor 35 extends from one end of a pump casing 32 and is rotatably mounted in an internal thread type stator 36 and made to rotate eccentrically to move a material to be transferred. On the other hand, as the driving shaft 33 of the drive unit (normally an electric motor) is supported by a bearing 37 and rotates on the center axis of the drive unit, the eccentricity of the rotor 35 undergoing eccentric rotation relative to the driving shaft 33 must be accommodated between them. The following methods are normally used:

(1) A universal joint is provided on each end of the metallic connecting rod 34 to accommodate the eccentricity.

(2) As shown in FIGS. 10 (*a*) and 10 (*b*), through holes 34*a* form bores which widen from the central axis towards the outer ends in a tapered manner and are provided at both ends of the metal connecting rod 34. Pins 34*b* are used to connect both ends to the rotor 35 and to the driving shaft 33, and retaining rings 34*c* are mounted over the pins 34*b* to form connections that are flexible in all directions within a certain limit.

A uniaxial eccentric screw pump has been put to practical use, wherein a metal flexible shaft is used, in place of universal joints or the like on both ends of the connecting rod as described in (1) and (2) above, to absorb the eccentricity of the rotor by the elastic deformation thereof, and various spring steels are mainly used for the flexible shaft:

(3) A flexible shaft is made of a spring steel, and the flexible shaft is formed with a small diameter (from 6 to 30 mm) and a long length (for example, about 800 mm). The flexible shaft is directly connected to the rotor and the driving shaft without universal joints or pin joints, and the flexibility (elastic deformation) of the spring steel is used to absorb the eccentricity of the rotor.

In the cases of (1) and (2) above, joints extend in the radial direction, and, particularly when the outside diameter of the joint on the rotor side is large, they will hinder the flow of the material to be transferred. Hence the inside diameter of the casing must be made larger to secure a sufficient cross section of the channel.

In the case of (3) above, the elastic deformation of a spring steel is small relative to that of plastics. Therefore, to secure the necessary eccentricity for the rotation of the rotor, the length of the flexible shaft must be made fairly long relative to that of the above-mentioned metal connecting rod. This, in turn, makes the pump casing longer, corresponding to the length of the flexible shaft. In consequence, as the entire system becomes very long, its field of use may be limited and the kinds of materials to be transferred may be limited. Moreover, when a liquid containing solids is to be transferred, the flexible shaft tends to be damaged because of the nature of the material (spring steel in particular) and may be broken in a short time. Furthermore, because of a lack in chemical resistance, when liquid chemicals such as sulfuric acid and hydrochloric acid are to be transferred, the exterior surface of the metal flexible shaft must be coated with a resin having chemical resistance, such as Teflon and epoxy resin, resulting in a fairly large increase in the production cost.

The present applicant has investigated the use of a flexible shaft of engineering plastic. A plastic flexible shaft is connected by an adhesive to a metal rotor and a metal driving shaft, but it has been found that when a flexible shaft of a large length is used, and when the pump is large with its discharge rate being 10 $m^3$/hr or over, the construction including this connecting method poses the following problems:

Because of its construction, when the length of the plastic flexible shaft must be 15 times or more as long as the outside diameter of the rotor or 1,000 m or more, if the shaft diameter is determined on the basis of the torque to be transmitted, the shaft may buckle near the middle of the shaft length due to the discharge pressure.

It is desirable to use, among various engineering plastics, PEEK (polyetheretherketone) because it has a high elastic deformation and it is excellent in fatigue resistance, chemical resistance, heat resistance, etc., but it is very expensive. Moreover, for large-sized pumps wherein the flexible shaft exceeds 1,000 mm in the required length, it is hard to obtain a PEEK shaft of such a length, and the use of a PEEK shaft, therefore, is not practicable.

When a method of simply bonding a plastic flexible shaft to metal parts such as rotor and driving shaft with an adhesive is used, the adhesive may peel off because a large load is exerted on the adhered connection. Although it is desirable to check the strength of adhesion before use, no nondestructive inspection method is available.

The present invention overcomes the above-discussed disadvantages of the prior art. According to the present invention, the joints between the rotor and the flexible shaft and between the driving shaft and the flexible shaft can be made compact to reduce the resistance during operation, the length of the flexible shaft can be made shorter relative to the metal flexible shafts made of spring steel as discussed in (3) above, the flexible shaft is excellent in chemical resistance and it is sanitary, and the production cost can be reduced. In addition to these objects, it is also an object of the present invention to solve problems inherent in the use of a very long flexible shaft for a large-sized pump with discharge rate of 10 $m^3$/hr or more.

SUMMARY OF THE INVENTION

To accomplish the above-mentioned objects, a uniaxial eccentric screw pump constructed in accordance with the present invention includes a uniaxial eccentric screw pump wherein an external thread screw-type rotor is rotatably inserted in an internal thread type stator. The rotor is connected, via a flexible shaft, to the driving shaft of a drive unit which is provided on one end of a pump casing, and made to rotate eccentrically to transfer a material to be transferred. The flexible shaft is made of an engineering plastic and its middle portion in the longitudinal direction thereof, is covered over its exterior by a metal sleeve.

Since the flexible shaft is made of an engineering plastic, its Young's modulus is extremely small in comparison with that of the conventional metal connecting rod. Hence any joints having a rod eccentricity absorbing function, such as universal joint and pin joint are not required, and the flexibility of the rod itself is utilized to absorb the eccentricity. In such a construction, the length of the flexible shaft may be reduced significantly relative to that of the conventional metal flexible rod (for example, to one half of the conventional length). Moreover, from the viewpoint of material, engineering plastics are generally excellent in chemical resistance and heat resistance, and a plastic flexible shaft can be used without relying on special treatment such as a Teflon coating; thus the cost can be reduced relative to that of the conventional metal flexible shaft. Furthermore, since the middle portion of the shaft is reinforced with a metal sleeve, its rigidity is improved and the shaft is prevented from buckling. Hence, even when a very long shaft is used, the pump can be safely used in applications where a relatively large discharge pressure is needed.

In another embodiment of the present invention, the flexible shaft may have a length 15 times or more as long as the outside diameter of the rotor, or of 1,000 mm or more. The middle portion of the flexible shaft is a metal pipe or a solid metal rod, and the flexible shaft portions made of an engineering plastic are connected to both ends of the metal rod.

In such a uniaxial eccentric screw pump, because a metal shaft is used in the middle which is the area prone to buckling, the overall strength against buckling is improved significantly. The metal rod for the middle portion normally lacks flexibility and cannot be expected to absorb much of the eccentricity of the rotor by its elastic deformation. However, since flexible shaft portions made of engineering plastics are used on both ends of the metal rod, these flexible shaft portions undergo elastic deformation to absorb the eccentricity of the rotor. Thus effects similar to the above-mentioned effects of the pump described above can be expected. When a pump is large and its discharge rate is 8 to 10 $m^3$/hr or over, it requires such a long flexible shaft that cannot be normally found in the market (1,000 mm or over). The present uniaxial eccentric screw pump, however, can be used when such a long shaft is needed and without fear of buckling due to an increase in discharge pressure caused by clogging of the discharge line. The shaft length of engineering plastics, which becomes expensive relative to the metal shaft when the shaft gets longer or the pump gets larger, is reduced to the minimum to save costs, and the metal rod and shaft portions of engineering plastics are combined. As a result, a flexible shaft of any desired length can be produced. When the overall length of the composite shaft is made longer, the swing angle (angular displacement due to elastic deformation caused by the eccentricity of the rotor) at each shaft portion made of engineering plastics, which is designed to absorb the eccentricity of the rotor, will be reduced, the forces perpendicular to the axis, working on both ends of the shaft portions of engineering plastics, will be reduced, and the wear on the sliding portions will be reduced.

In another feature of the present invention, at each connection between one end of a flexible shaft portion made of engineering plastics and one end of a metal driving shaft or a metal rotor, a center hole is formed in one end face of the flexible shaft, and a metal member having an integral protrusion that can be inserted in the center hole, is bonded onto one end face of the flexible shaft in advance. Further, a center hole is made in one end face of the driving shaft or the rotor, and one end of the flexible shaft is inserted, together with the metal member, into the center hole, and they are bonded with an adhesive.

In a uniaxial eccentric screw pump as disclosed above, the adhesion area between the member of engineering plastics and the member of metal is increased, and adherents between metal members are also provided. As a result, the strength of adhesive bonding is improved. As the strength of adhesive bonding between the plastics (resin) and the metal is lower than that between metals, the provision of adherents between metals increases the strength of adhesive bonding of the entire connections. This construction is effective not only for a flexible shaft with a metal sleeve or with a metal rod in the middle thereof but also for a flexible shaft that is made of engineering plastics over its entire length.

A further feature of the invention, wherein there is a connection between a shaft end portion made of engineering plastics and one end of the metal driving shaft or metal rotor, a center hole is made in one end face of the driving shaft or the rotor, and a key way is made in the inner circumference of this center hole. A key corresponding to the key way is protrusively bonded onto the outer circumference of one end of the plastic shaft end portion, and the end is inserted into the center hole and bonded with an adhesive. In this embodiment, the mechanical strength is added by the adoption of the system of fits between a key and a key way, and the overall strength of the connection is improved. In particular, with the use of the system of fits between a key and a key way, the transmission of rotating forces between the driving shaft and the flexible shaft and between the flexible shaft and the rotor is made without relying on an adhesive. Hence the flexible shaft of engineering plastics can be used reliably for large-sized pumps that require high horsepower.

In a uniaxial eccentric screw pump as described above or in a uniaxial eccentric screw pump having a flexible shaft which is made of engineering plastics over the entire length, one end of a sleeve-shaped metal coupler is integrally mounted, by bonding, on one end of the flexible shaft. A small-diameter protrusion integrally formed on this coupler is inserted in a center hole formed in one end face of the rotor, and is removably connected by means of a set screw extending perpendicularly to the axis of the center hole, or, alternatively, one end of a sleeve-shaped metal coupler is integrally mounted, by bonding, on one end of the flexible shaft. An internal-threaded portion formed on the internal circumference of the other end of this coupling is removably screwed over an external-threaded portion formed on the exterior surface of one end of the rotor to connect them.

In the foregoing uniaxial eccentric screw pumps, the flexible shaft and the rotor can be disconnected easily. Hence it is relatively easy to replace the rotor which is generally short in service life relative to the flexible shaft, and to exchange with a rotor of different material or a rotor with surface treatment such as electroplating to match the kind of material to be transferred.

In a still further embodiment including a flexible shaft portion which is made of an engineering plastic, one end of the flexible shaft portion is tapered so that the outside diameter thereof is reduced gradually towards the top end, and a tapered center hole is made in one end face of the driving shaft or the rotor. The tapered end of the flexible shaft is inserted in this tapered center hole and bonded therein with an adhesive. With this configuration, the strength of the adhesive at its optimal film thickness can be attained in comparison with the adhesion of cylindrical straight surfaces, and when the end of the flexible shaft is inserted into the center hole of the rotor or the driving shaft, the larger-diameter inlet of the center hole serves as a guide to ease the insertion.

As another feature of the invention, it is desirable to use PEEK (polyetheretherketone) for the engineering plastic. In this case, because PEEK has high flexibility with a Young's modulus of about ⅕₀ that of spring steel, and has an outstanding fatigue resistance, the overall length of the flexible shaft can be reduced further relative to other engineering plastics. PEEK is also excellent in heat resistance, and hence the pump can be used to transfer materials having high temperature.

One end of the flexible shaft made of plastic can be integrally connected to one end of the driving shaft. In this uniaxial eccentric screw pump, the joint between the flexible shaft and the driving shaft and the portions adjacent to the joint can be reduced in length, and hence the length of the entire system can be reduced, and the number of the parts for the joint can be reduced.

In another feature of the invention, a mechanical seal is used for the shaft seal of the driving-shaft-side end of the pump casing. Hence a window in the driving shaft casing for retightening of the shaft seal is not a requirement, and the driving shaft portion corresponding to said window length can be shortened. In such a uniaxial eccentric screw pump, mechanical seals are used exclusively; and periodical retightening, which is needed for gland packing, is not required. Hence no window for inserting a spanner, etc. to turn is required, and the length of the driving shaft portion required for retightening becomes redundant and can be eliminated. As a result, the overall length of the system can be reduced. This effect is enhanced further when this arrangement is combined with the screw joint connection as described above. Since a window for retightening a seal is not provided, the safety of the unit is improved, and no cover is required for a window and, in turn, the number of the parts is reduced and the construction is simplified.

BRIEF DESCRIPTION OF THE DRAWINGS

The foregoing will be better understood from the following detailed description taken in conjunction with the accompanying figures of the drawings, wherein:

FIG. 3 (*b*) is an enlarged sectional view of a boss of the rotor of FIG. 2;

FIG. 3 (*c*) is an enlarged sectional view of a joint head of FIG. 2;

FIG. 8 (*a*) is an enlarged sectional view showing a joint of the pump of FIG. 7;

FIG. 8 (*b*) is an enlarged sectional view taken on the line 8 (*b*)—8 (*b*) of FIG. 8 (*c*);

FIG. 8 (*c*) is a partial sectional view of FIG. 8 (*b*);

FIG. 10 (*a*) is an enlarged sectional view of a circled portion of the pump of FIG. 10; and FIG. 10 (*b*) is an enlarged sectional view of another circled portion of the pump of FIG. 10.

DETAILED DESCRIPTION OF THE INVENTION

Figure 1:
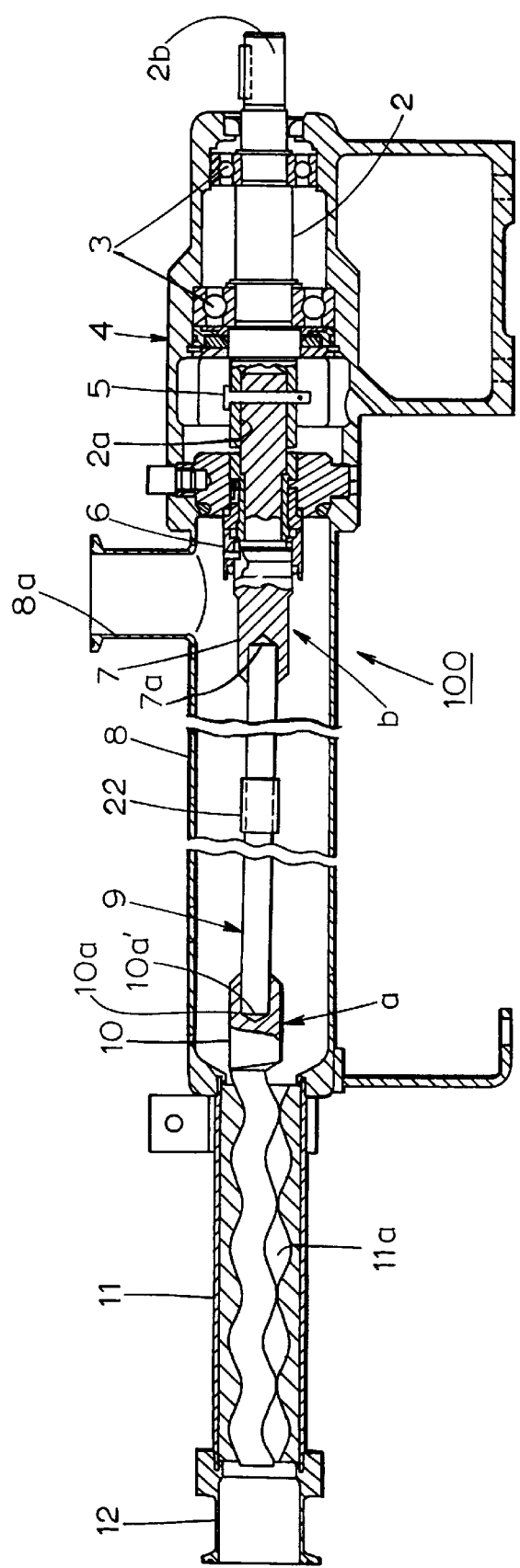
FIG. 1 is a side view partially in section of a uniaxial eccentric screw pump in accordance with a first embodiment of the present invention.

With reference to FIG. 1, a uniaxial eccentric screw pump 100 of a horizontal type is shown. It includes a stator 11 connected to one end of a pump casing 8, and an end stud 12 constituting a discharge port is connected to an outer end of the stator 11. A bearing unit 4 supporting a driving shaft 2 is connected to the other end of the casing 8. The driving shaft 2 is rotatably supported by ball bearings 3 of the bearing unit 4, and a drive motor (not illustrated) is connected to its end 2*b* extending from the bearing unit 4. On the top of the casing 8, close to the bearing unit 4, an intake opening 8*a* is provided which opens upwardly, the opening 8*a* being cylindrical, and constituting the suction port and having an outward flange around the top end thereof. One end of a driving shaft 7, to which a flexible shaft 9 made of an engineering plastic, is connected in an integrally rotatable manner, is inserted into a center hole 2*a* of the driving shaft 2 and connected by means of a coupling pin 5.

The stator 11 has a spiral internally threaded hole 11a of which the pitch is twice as large as that of the rotor 10. The cross section of the hole 11*a* is oval, and the external thread type rotor 10, having a circular cross section is inserted in the hole 11*a*, the rotor 10*a* being rotatable and movable in the vertical direction. A boss 10*a* is integrally formed on one end (on the side toward the pump casing 8) of the rotor 10, and one end of the flexible shaft 9 is inserted in the boss 10*a* and connected with the rotor 10 in an integrally rotatable manner by means of an adhesive to form a rotor joint a. This flexible shaft 9 is a feature of the present invention, and in this embodiment, it is formed of a cylindrically extruded rod of an engineering plastic, preferably PEEK (polyetheretherketone), and a sleeve 22 of metal (such as stainless steel, aluminum alloy, etc.) is mounted over the outer circumference of the flexible shaft 9 in the middle section along the longitudinal direction thereof.

The other end of the flexible shaft 9 is inserted into a joint (indicated by the arrow b in FIG. 1) of the driving shaft 7, the joint being symmetrical to the rotor joint a of the boss 10*a*, and bonded integrally with an adhesive (e.g. epoxy adhesive). The driving shaft 7 partly intrudes in the casing 8, and a mechanical seal 6 is mounted over this intruding portion to effect a shaft seal.

The uniaxial eccentric screw pump 100 of this embodiment is a pump that can transfer liquids, slurries, etc. and is suited for a medium-sized pump with a discharge rate of about 2 to 7 m³/hr. The entire shaft is made of PEEK which is highly flexible, but even when the shaft is fairly long due to the requirements of the application, the metal sleeve 22 covering the middle section in the longitudinal direction of the shaft improves the rigidity, and the possibility of buckling is low. The pump 100, therefore, is effective in transfering material which requires a relatively high discharge pressure. In the pump 100 of this embodiment, the length of the metal sleeve 22 can be adjusted to meet the required degree of reinforcement. Conversely, with regard to pumps for general purpose, a pump shorter in the overall length performs better. In the conventional pumps which use spring steel for the flexible shaft, the length of the flexible shaft was required to be about 600 mm. In the present embodiment, wherein PEEK was used for the flexible shaft 9, the ratio of the allowable shearing force to Young's modulus was large in comparison with the flexible shaft of spring steel, and the flexibility (elastic deformation) and the strength were high. Hence the length of the flexible shaft 9 could be reduced to about 400 mm or about ⅔ of the length of the flexible shaft of the conventional pumps, and the eccentricity of the rotor 10 was absorbed successfully without any inconveniences. PEEK and other engineering plastics are excellent in chemical resistance, high in heat resistance, and, in the mechanical aspect, are not easily subjected to the effects of stress concentration. Hence there is no need to consider fatigue failures due to cutting, notches, etc., and corrosion cracking. As the surface of the flexible shaft 9 needs no protective film treatment such as Teflon coating, the production is simplified and the production cost can be reduced.

Figure 10:
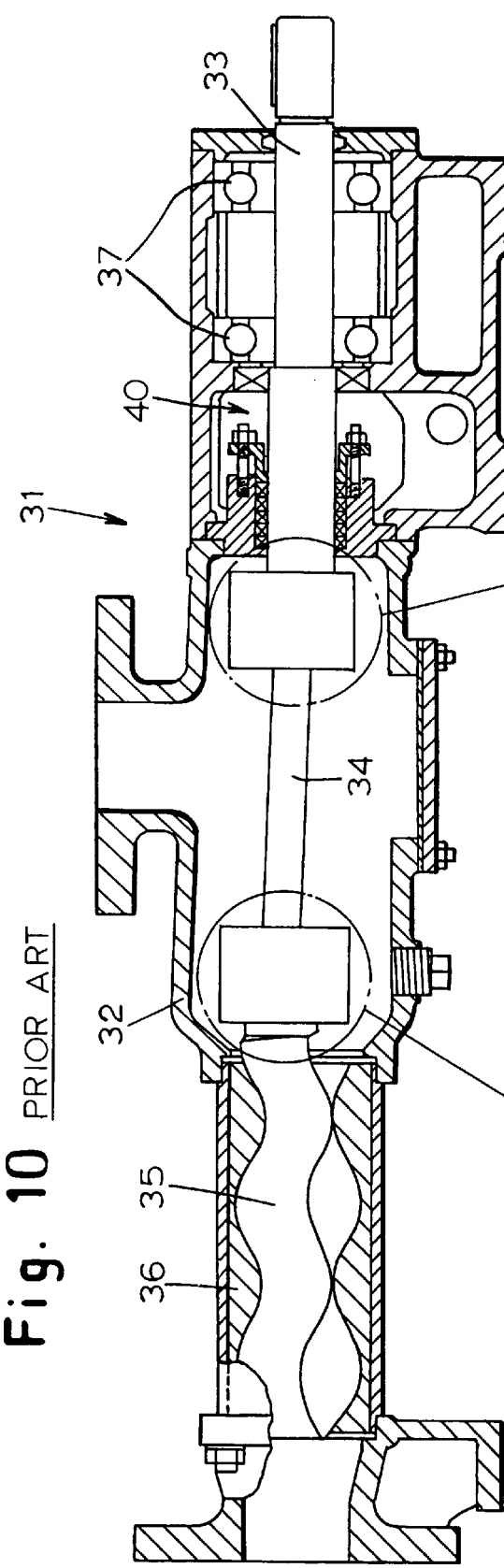
FIG. 10 is a side view partially in section showing an example of a conventional uniaxial eccentric screw pump.
Figure 10A:
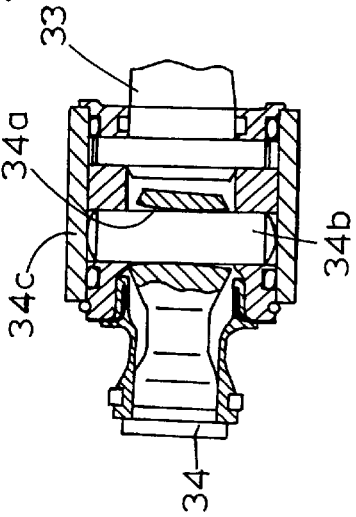
Figure 10B:
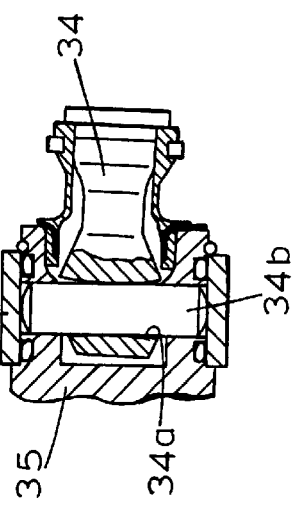

As explained above, both ends of the flexible shaft 9 are inserted in the center holes 10a' and 7a made in the rotor 10 and the driving shaft 7, and joints (connections) between the flexible shaft 9 and the rotor 10 and the driving shaft 7 are made by bonding with an adhesive. Hence the joints are very simplified in comparison with the conventional joint constructions such as pin joint and universal joint. Since the outside diameter of the joint can be reduced and the joint can be made smaller, the channel resistance during the transfer can be reduced. As a result, the inside diameter of the casing can be reduced to the minimum. This, in turn, has the effect of reducing the quantity of the liquid left in the casing 8. The construction of this embodiment is particularly suited to small-sized pumps. As is clear from FIG. 1, the construction is extremely simplified in comparison with the conventional pumps of this kind (see FIG. 10), and the number of parts is significantly reduced, hence even if the expensive PEEK plastic is used, the overall cost of the pump can be reduced.

Moreover, the adoption of the mechanical seal 6 eliminates the need of providing the bearing unit 4 with a window for retightening (see numeral 40 of FIG. 10), and the corresponding length can be reduced for the bearing unit 4 and the driving shaft 2. Further, with the use of the mechanical seal 6 of no water injection type, the pump can be used to transfer chemicals.

Figure 2:
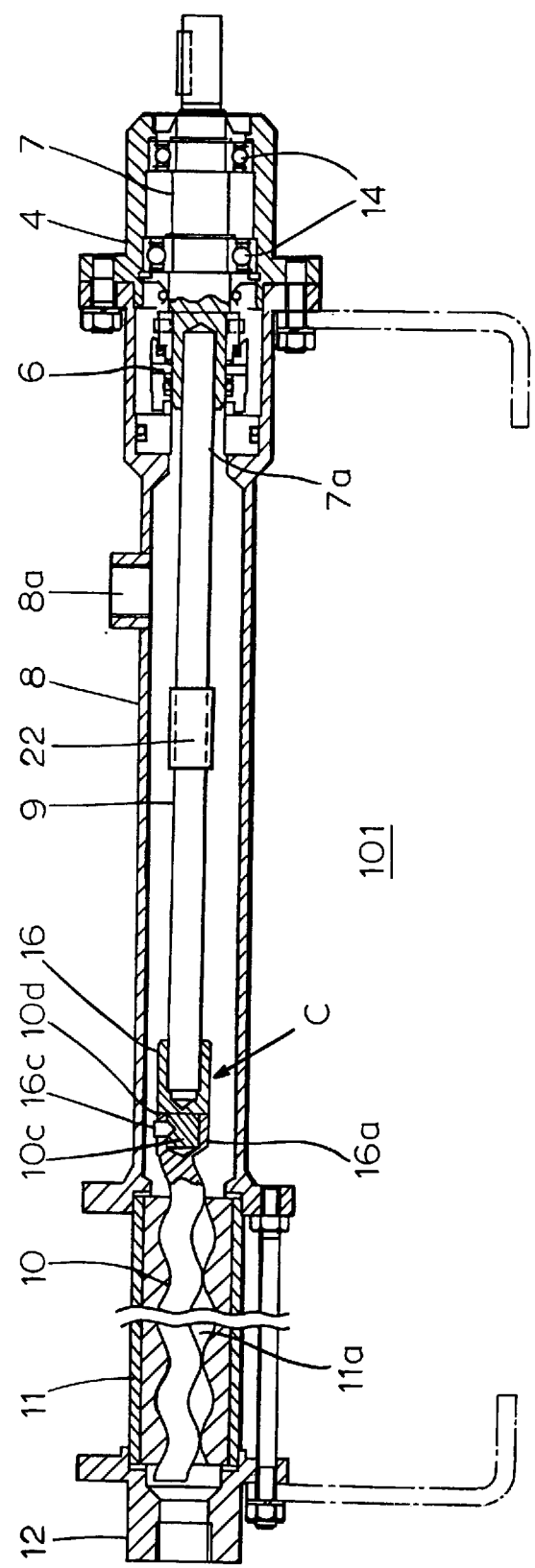
FIG. 2 is a view similar to FIG. 1 but showing a second embodiment of the present invention.
Figure 3A:
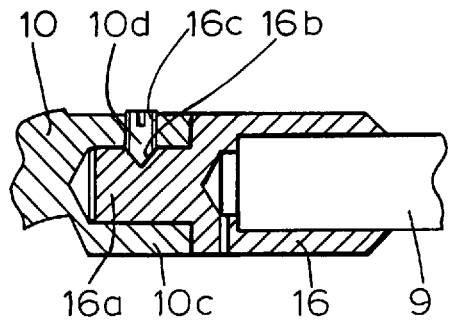
FIG. 3 (*a*) is an enlarged sectional view of an assembled joint of the pump of FIG. 2.
Figure 3B:
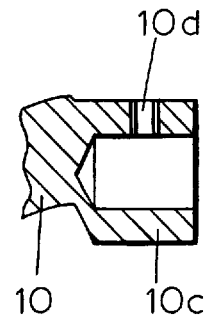
Figure 3C:
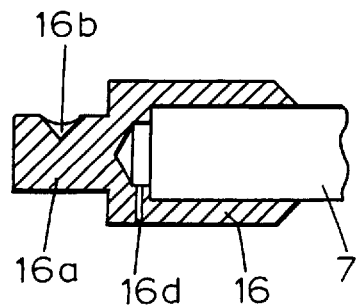

FIGS. 2, 3 (a), 3 (b) and 3 (c) illustrate a uniaxial eccentric screw pump 101 which differs from the pump of the above-mentioned first embodiment in the following respects:

(1) In place of the joint (the arrow a of FIG. 1) at one end of the rotor 10, a boss block 10c [see the arrow c of FIG. 2 and FIG. 3 (a)] is provided integrally. One end of a flexible shaft 9 is inserted into a cylindrical joint head (coupler) 16 and bonded with an adhesive, the cylindrical joint head 16 being integrally provided with a protrusion 16a that can be inserted into the boss block 10c. An internally threaded set screw hole 10d is radially formed in the boss block 10c, and the interior end of a set screw 16c, which screws into the internally threaded hole 10d, is inserted into an indentation 16b formed in the protrusion 16a to removably secure the protrusion 16a. The above-mentioned construction is shown in detail in FIG. 3 (a). Numeral 16d in FIG. 3 (c) denotes an air vent hole.

(2) A center hole 7a is formed in one end face of a driving shaft 7, and the other end of the flexible shaft 9 is inserted in the center hole 7a and bonded with an adhesive, e.g. epoxy adhesive. However the present embodiment differs from the first embodiment in that the driving shaft 7 is not separate from the driving shaft 2. The driving shaft is not divided into two shafts, and there is only one driving shaft. Regarding other construction features common to both embodiments, numerals identical to those of FIG. 1 are used to denote them, and a description is omitted.

In the uniaxial eccentric screw pump 101 of the present embodiment, the rotor 10 and the flexible shaft 9 can be disconnected easily. Hence it is possible to replace the rotor 10 alone, which has a shorter life relative to the flexible shaft, and to replace the rotor with a rotor of a different material or a rotor which has been given a surface treatment such as electroplating, according to the kind of material to be transferred. As in the first embodiment, PEEK having a high flexibility is used for the flexible shaft 9, and a metal sleeve 22 is mounted over the flexible shaft 9 in the middle section in the longitudinal direction. As is clear from FIG. 2, the end of the flexible shaft 9 at the end adjacent the driving shaft 7 is connected at a point closer to the bearing unit 4 to reduce the length of the casing 8. As a result, the overall length of the pump 101 is reduced, and the demerit of the flexible shaft 9 (that it tends to be longer due to the structural reason in comparison with the uniaxial eccentric screw pump of a different construction using pin joints, etc.) is lessened. Since the flexible shaft 9 and the driving shaft 7 are integrated, the length of both parts in combination is reduced to some extent relative to the situation where both parts are separate, and the elongation of the flexible shaft 9 is controlled to some extent, and moreover, the number of parts is reduced to ease the maintenance.

Figure 4:
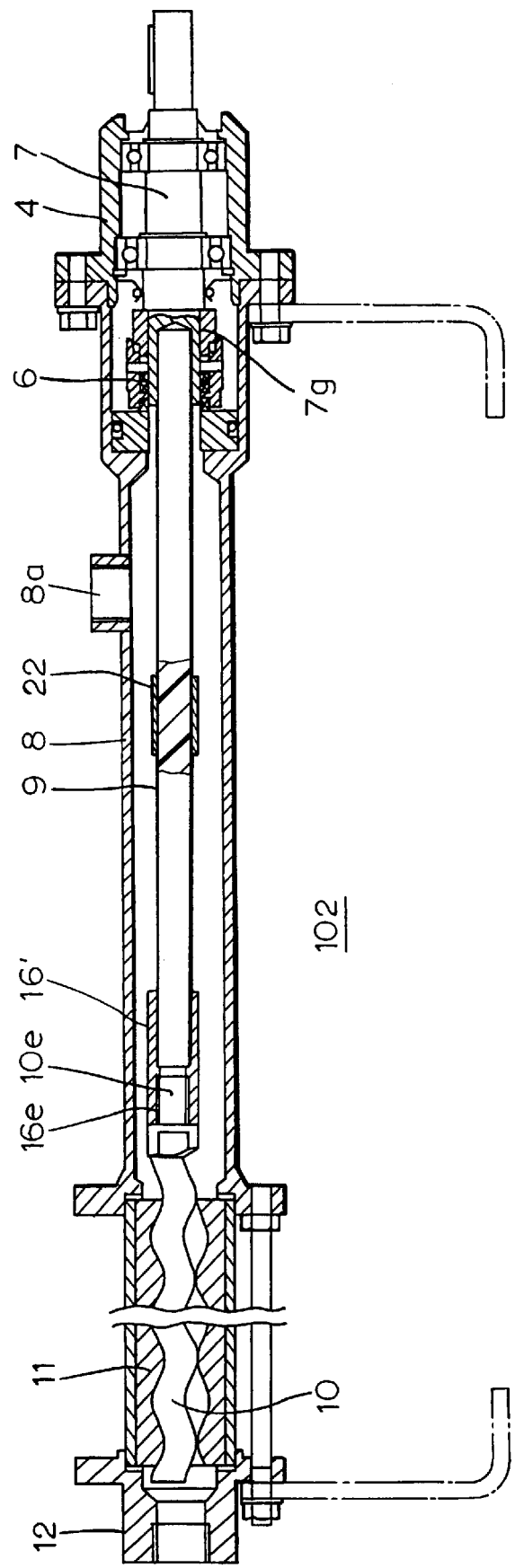
FIG. 4 is a view similar to FIG. 2 but showing a third embodiment of the present invention.

The uniaxial eccentric screw pump 102 shown in FIG. 4 differs from the pump of the above-described first embodiment in the following respects:

(1) In place of the joint (the arrow a of FIG. 1) on one end of the rotor 10, an externally threaded block 10e is provided. An internally threaded block 16e that engages the block 10e is formed on the inner circumference of one end of a cylindrical joint head (coupler) 16', and one end of a flexible shaft 9 (which is made of plastic) is inserted into the other end of the cylindrical joint head 16' and bonded with an adhesive.

(2) One end of the driving shaft 7 is formed into a boss 7g, and the other end of the flexible shaft 9 is inserted into the boss 7g and bonded thereto with an adhesive to form an integral joint. As to other construction features which are common to both embodiments, numerals identical to those of FIG. 1 are used to denote them, and the description is omitted.

In the uniaxial eccentric screw pump 102 of this embodiment, just like the above-mentioned second embodiment, the rotor 10 and the flexible shaft 9 can be easily disconnected from each other. Hence it is possible to replace the rotor 10 alone. As is clear from FIG. 4, one end of the flexible shaft 9 is inserted on the inner side of the bearing unit 4 to actually reduce the length of the flexible shaft 9 present in the casing 6. Hence the overall length of the system is reduced considerably relative to the overall length of the flexible shaft 9; this lessens the demerit that a flexible shaft having a large length must be used. Thus the present embodiment has advantages similar to those of the second embodiment.

Figure 5:
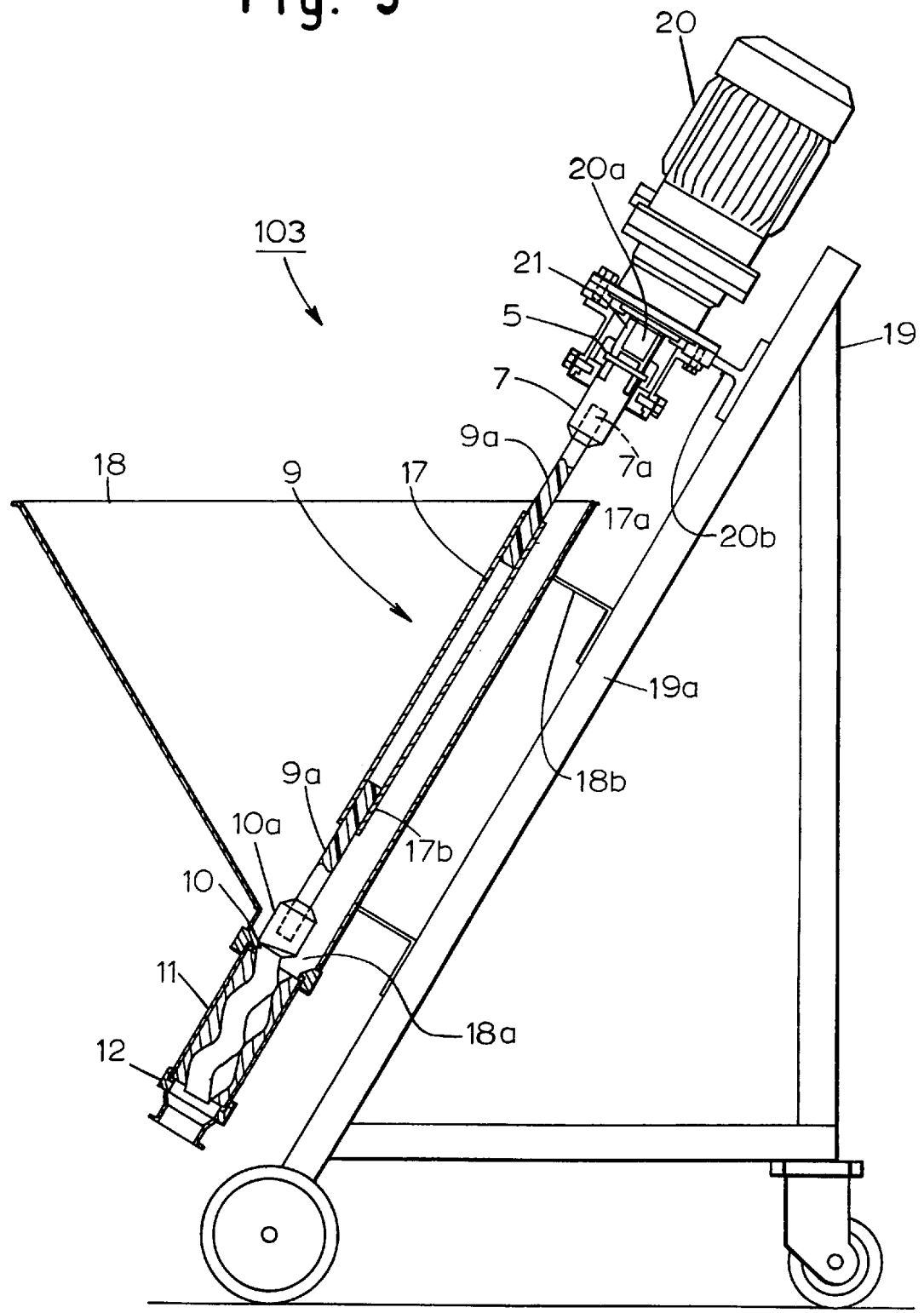
FIG. 5 is a side view partially in section of a uniaxial eccentric screw pump in accordance with a fourth embodiment of the present invention.

FIG. 5 shows a fourth embodiment of the invention. The uniaxial eccentric screw pump 103 of this embodiment, as shown in FIG. 5, differs from the pumps of the above-mentioned first through third embodiments in the following respects:

(1) A pump assembly comprising a stator 11 and a rotor 10 is connected to the outlet opening 18a in the bottom of an inverted-circular-cone-shaped hopper 18, the opening 18a being on an extension of the normal (or one sectional line of the wall of the circular cone) of the hopper 18, and an end stud 12 forming a discharge port is mounted on the discharge end of the stator 11.

(2) In this construction, the hopper 18 also serves as the pump casing, and shaft seals, such as mechanical seals, are not required.

(3) On a sloped rail 19a of a support truck 19, which in the present example is a triangle in shape as seen from the side, the hopper 18 is mounted via brackets 18b. A drive motor 20 is mounted on the top end of the rail 19a via a bracket 20b. The end of the driving shaft 20a of the drive motor 20 and the top end of the rotor 10 are connected by a flexible shaft 9, and this flexible shaft 9 is arranged inside the hopper 18 in parallel with the normal side thereof. Generally speaking, this type of machine requires a long flexible shaft, the length depending on the capacity of the hopper 18. In the present embodiment, the middle section of the flexible shaft 9 is formed by a tubular pipe rod 17 made of a metal (such as stainless steel and aluminum alloy), and both ends of the rod 17 are formed into bosses 17a and 17b, respectively. One end of a round bar flexible shaft portion 9a made of PEEK is inserted into the boss 17a, and one end of another round bar flexible shaft portion 9a made of PEEK is inserted into the boss 17b, and they are integrally bonded by an adhesive. The other end of one flexible shaft 9a is inserted into a boss 10a formed in the end of the rotor 10 and integrally bonded with an adhesive, and the other end of the other flexible shaft 9a is inserted in a center hole 7a of the driving shaft 7 and integrally bonded with an adhesive. The other end of the driving shaft 7 is connected to a coupling sleeve 21 with a coupling pin 5 so that they can rotate integrally, the coupling sleeve 21 being mounted on the driving shaft 2 as a shrink fit, for example. Since other construction features are common to the pump 100 of the first embodiment, numerals identical to those of FIG. 1 are used to denote them, and further description is omitted.

The uniaxial eccentric screw pump 103 of the present embodiment has the following effects and advantages because the middle portion of the flexible shaft 9 is formed by the metal rod 17:

(a) The rigidity is higher relative to the case where the entire shaft is made of an engineering plastic such as PEEK, and the strength against buckling is improved. Hence the pump is effective when a relatively large discharge pressure is required and when the discharge pressure increases due to a blockage of the discharge line.

(b) When a specially long flexible shaft is required, the length of the metal middle pipe rod 17 can be selected freely to form a flexible shaft suited to the exact requirements.

(c) When the length of the flexible shaft 9 is increased, the swing (elastic deformation) angle of the flexible shaft portions 9a for absorbing the eccentricity of the rotor 10 will be reduced, the loads acting on both ends of the flexible shaft portions 9a in a direction perpendicular to the axis thereof will be reduced, and the wear of the sliding portions of the rotor 10 and the stator 11 will be reduced.

(d) The PEEK plastic shaft portions 9a connected to both ends of the metal rod 17 are made of a very expensive material. However, the lengths of the shaft portions 9a can be minimized by selecting the length of the metal rod 17. Hence the overall production cost of the flexible shaft 9 is reduced. The merit of cost reduction is particularly great for PEEK shaft portions 9a having relatively large diameters (maximum outside diameter of about 80 mm) for use in large-sized pumps.

(e) For large-diameter (maximum outside diameter of about 80 mm) flexible shafts 9 used in large-sized pumps, the required length for absorbing the eccentricity of the rotor 10 is fairly large, but the length of the PEEK shaft portions can be reduced to a length that is available in the market. Cost reduction can be sought from this point as well.

Figure 6:
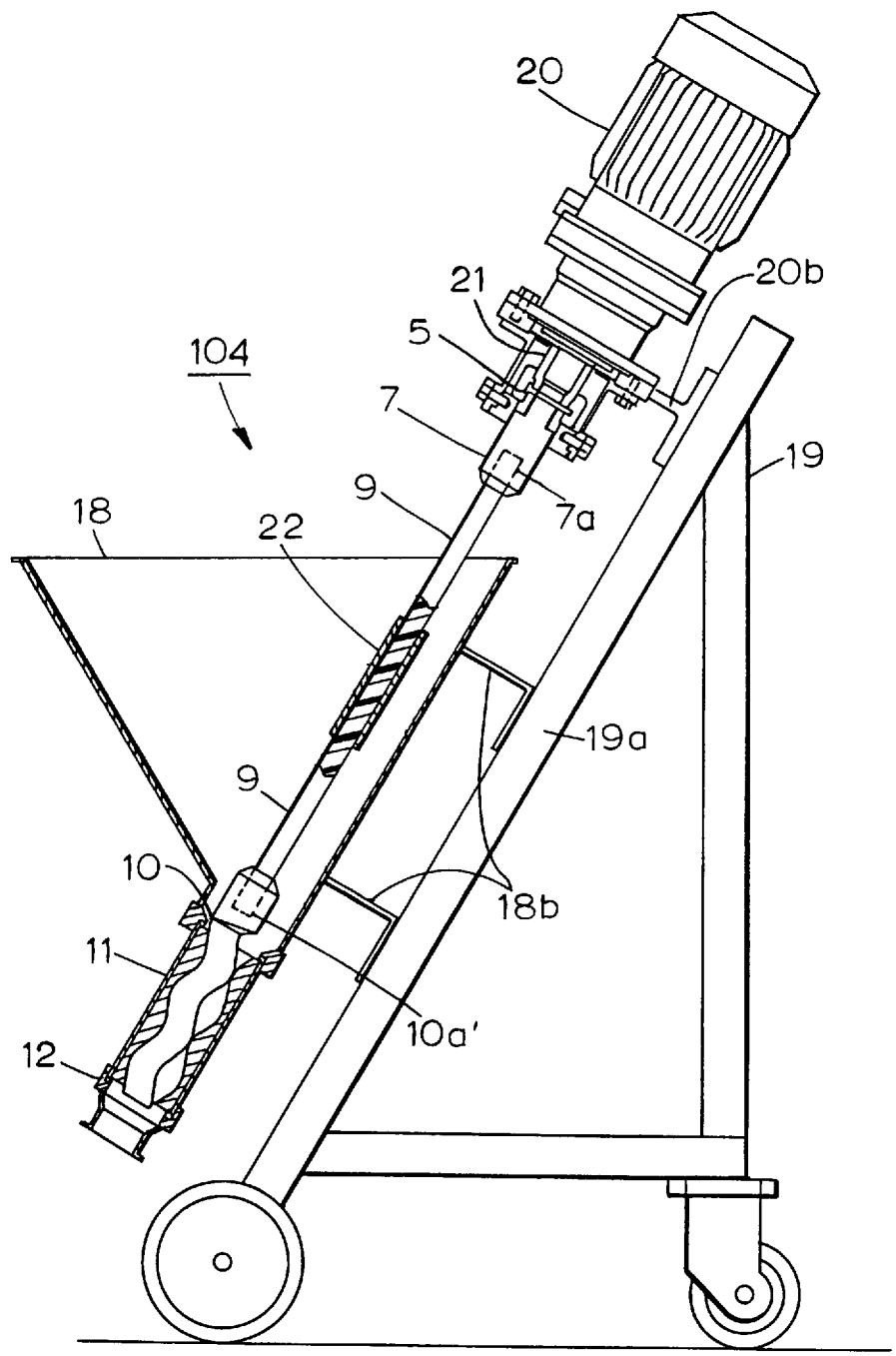
FIG. 6 is a view similar to FIG. 5 but showing a fifth embodiment of the present invention.

FIG. 6 shows a uniaxial eccentric screw pump according to a fifth embodiment of the invention. The uniaxial eccentric screw pump 104 of this embodiment differs from the pump 103 of the above-described fourth embodiment as follows:

(1) PEEK plastic is used for the entire length of the flexible shaft 9, and a sleeve 22 of a metal (e.g. stainless steel) is bonded over the outer circumference of its middle portion in the longitudinal direction.

(2) Both ends of the flexible shaft 9 are inserted in the center holes 10a' and 7a formed in the rotor 10 and the driving shaft 7 and bonded thereto with an adhesive.

In the uniaxial eccentric screw pump 104 of this embodiment, the entire shaft or rod is made of PEEK plastic having high flexibility. Even if the length is increased to some extent, the metal sleeve 22 in the middle in the longitudinal direction increases the rigidity to eliminate the possibility of buckling. The pump is effective in transfer where a relatively large discharge pressure is required.

Figure 7:
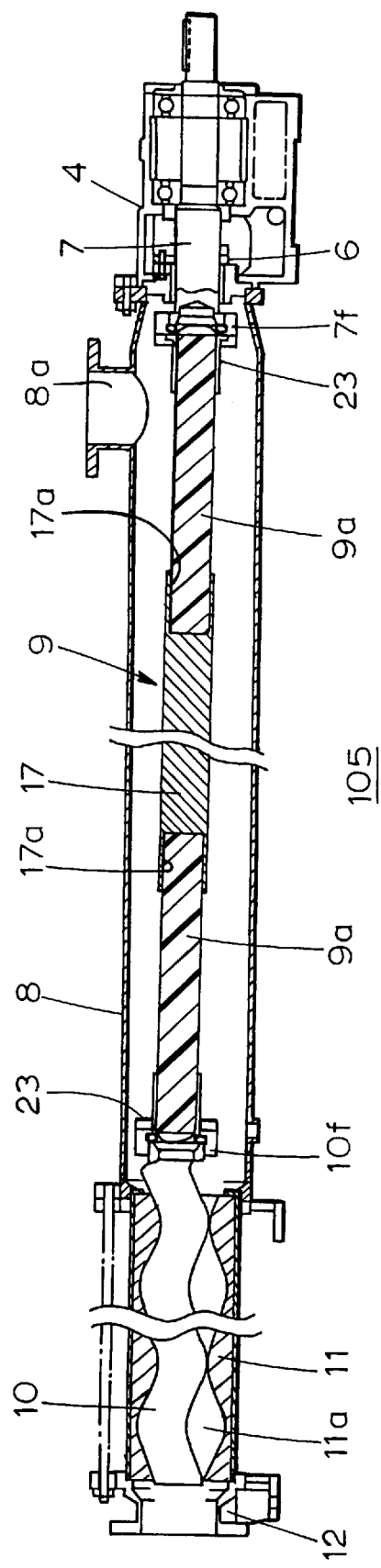
FIG. 7 is a view similar to FIG. 1 but showing a sixth embodiment of the present invention.

FIG. 7 shows a sixth embodiment of this invention. The uniaxial eccentric screw pump 105 of this embodiment comprises a relatively large-sized pump having a discharge rate of 10 m$^3$/hr or more, and has a basic construction which is common to that of the pump 101 of the above-mentioned third embodiment. The pump 105 differs from the pumps of the above-mentioned embodiments as follows:

(1) A solid metal rod 17 is used in the middle section, in the longitudinal direction, of the flexible shaft 9, and PEEK plastic flexible shaft portions 9a are inserted into openings 17a provided in both ends of the solid rod 17 and bonded thereto with an adhesive.

(2) A coupler 23 having an integral sleeve for insertion is bonded to the other end of each flexible shaft portion 9a, and the couplers 23 are connected to flanges provided at the ends of the rotor 10 and the driving shaft 7 by means of a coupling or by bonding with an adhesive.

Figure 9:
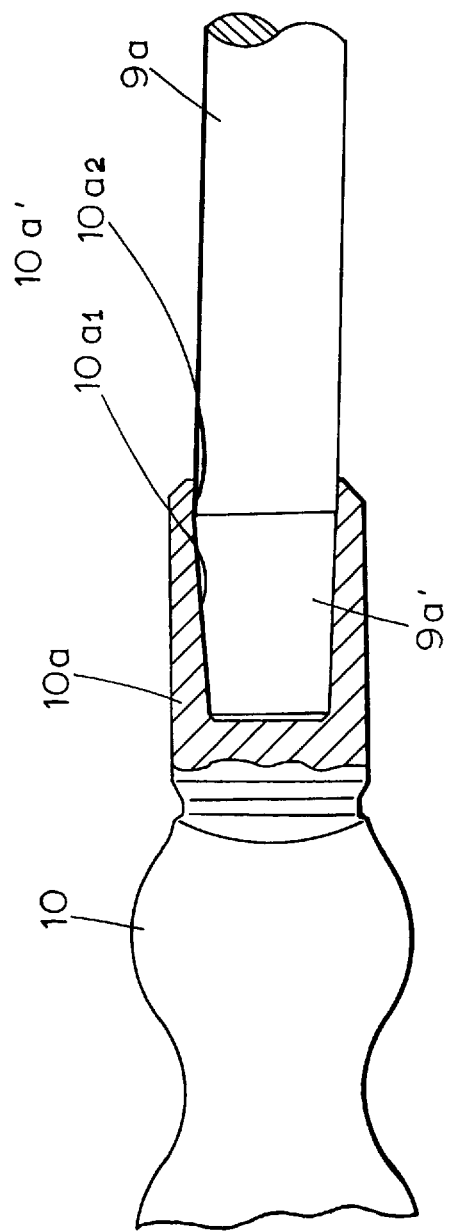
FIG. 9 is an enlarged sectional view showing another example of a joint of the pump of FIG. 7.

The uniaxial eccentric screw pump 105 of this construction is for large-sized pumps, wherein the length of the flexible shaft 9 is, for example, 1,000 mm or over. When one seeks to attain the optimal film thickness of bonding for the flexible shaft of this type of machine, high precision of working is needed for both the outside diameters of the flexible shafts 9a and the inside diameters of the holes 17a of the metal rod 17, resulting in higher cost of production. Moreover, as the rotating force (torque) to be transmitted and the thrust load to bear are large, it may be necessary, in some cases, to increase the strength of adhesive bonding or to adopt a mechanical reinforcing structure. Examples are as follows:

a) As shown in FIG. 8 (a), a center hole 9c is formed in one end face of the flexible shaft portion 9a, a disc-shaped metal head 24 having an integral protrusion 24a that can be inserted into the center hole 9c is inserted in the center hole 9c and bonded with an adhesive. Then one end of the flexible shaft portion 9a is inserted in, for example, the hole 17a of the metal rod 17 (or the center hole of the driving shaft 7 or the rotor 10) and bonded with an adhesive.

b) As shown in FIG. 8 (b), a key way 25a is formed in the internal circumference of the hole 17a of the metal rod 17 or the center hole of the driving shaft 7 or the rotor 10, a slot 25b is formed in the external circumference of the flexible shaft portion 9a and a key 25 is fixed in the slot 25b by bonding, and the shaft portion 9a is inserted, together with the key 25, into the hole 17a or the like, and bonded with an adhesive. A plurality of keys may be provided as shown in FIG. 8 (c).

c) As shown in FIG. 9, the outer circumference 9a' of the end of the flexible shaft portion 9a is tapered so that the outside diameter is reduced towards the outer end thereof, and the center hole 10a' of the boss block 10a of the rotor 10 (including the metal rod 17 and the driving shaft 7) is formed into a tapered hole $10a_1$ corresponding to the tapered outer circumference 9a' of the end of the flexible shaft portion 9a. The inlet portion of the center hole 10a' is formed into a straight hole $10a_2$ to make it serve as a guide. Then the tapered end 9a' of the flexible shaft portion 9a is inserted in the center hole 10a' of the boss block 10a of the rotor 10 and bonded with an adhesive.

When the measures of a) above are taken, the bonding between metals has a higher strength of adhesive bonding relative to the bonding between a resin and a metal, and as the area of bonding is increased by bonding the metal head 24 to the shaft portion 9a via the protrusion 24a, the strength of adhesive bonding is increased.

When the measures of b) above are taken, the load on the adherent is reduced since the force in the rotating direction and the thrust are transmitted by the engagement of each key 25 and its key way 25a.

When the measures of c) above are taken, the strength of the adhesive at its optimal film thickness is attained, and when the tapered end 9a' of the flexible shaft portion 9a is inserted into the center hole 10a' of the rotor 10, the large-diameter inlet portion (straight hole $10a_2$) of the center hole 10a' serves as a guide to ease the insertion. In the present embodiment, as the inlet portion of the center hole 10a' is formed into the straight hole $10a_2$, generation of any gap between the center hole 10a' and the end 9a' of the flexible shaft portion 9a is reliably prevented.

Six embodiments of the uniaxial eccentric screw pump of the present invention have been shown in the drawings and described above. The uniaxial eccentric screw pump of the present invention can be put into practice as follows:

a) In addition to the above-mentioned PEEK plastic, appropriate engineering plastic for the flexible shaft 9 includes, for example, polyimide and polyethersulfone.

b) The position of the metal rod 17 is not limited to the middle of the flexible shaft 9 along its longitudinal direction. For example, three flexible shaft portions 9a and two metal rods 17 may be alternately connected to form one flexible shaft.

c) The connecting structures of the above-mentioned second and third embodiments and the connecting structures shown in FIG. 8 (a), FIG. 8 (b) and FIG. 9 are also applicable, although illustration is omitted, to a uniaxial eccentric screw pump having a flexible shaft which is made entirely of engineering plastics such as PEEK, such a flexible shaft not being provided with any metal sleeve 22 or metal rod 22, and such structures have similar effects in these cases.

What is claimed is:

1. A uniaxial eccentric screw pump comprising:
an internal-screw type stator;
an external screw type rotor mounted for eccentric rotation within the stator and having a center hole at one end;
a drive shaft having a center hole at one end;
a flexible shaft made of an engineering plastic, having a middle portion in the longitudinal direction thereof which is either formed of metal or covered by a metal sleeve, and also having longitudinal ends that fit within the center holes on the ends of the rotor and the drive shaft; and
adhesive bonding the ends of the flexible shaft within the center holes.

2. A pump according to claim 1, wherein the end of the flexible shaft bonded to the end of the drive shaft fits within a center hole on a coupler that is integrally connected to the end of the drive shaft.

3. A pump according to claim 1, and further comprising a pump casing, a drive unit mounted in the pump casing with the drive shaft extending from one end of the pump casing, and a mechanical seal forming a shaft seal between the drive shaft and the pump casing, the customary window for retightening of the shaft seal being eliminated from the pump casing whereby the length of the drive shaft can be shortened by a distance corresponding to the length of the window.

4. A pump according to claim 1, wherein the center hole on one of the drive shaft and rotor is on a part secured to the rest of the drive shaft or rotor by an adhesive.

5. A pump according to claim 4, wherein a center hole is formed in an end face of the end portion of the flexible shaft, and the part comprises a metal coupler having an integral protrusion that is inserted in the center hole and is bonded onto an end face of the drive shaft or rotor, which also has a center hole formed in the end face thereof, and end portion of the flexible shaft is positioned, together with the metal coupler, in the center hole of the drive shaft or rotor and bonded thereto with the adhesive.

6. A pump according to claim 4, wherein a center hole is formed in an end face of the drive shaft or rotor, and a keyway is formed in the inner circumference of the center hole, and the part comprises a key positioned in the keyway and bonded by the adhesive onto the outer circumference of the end portion of the flexible shaft, the end portion being inserted into the center hole and bonded thereto with the adhesive.

7. A pump according to claim 4, wherein the part comprises a sleeveshaped metal coupler integrally secured by bonding with the adhesive, on the end portion of the flexible shaft, a small-diameter protrusion integrally formed on the coupler and inserted in a center hole formed in an end face of the drive shaft or rotor, and a set screw extending perpendicularly to the axis of the center hole and connecting the drive shaft or rotor with the coupler.

8. A pump according to claim 4, wherein the part comprises a sleeve-shaped metal coupler integrally mounted, by bonding with the adhesive, on the end portion of the flexible shaft, the coupler having an internal-threaded portion formed on an internal circumference and removably screwed over an external-threaded portion formed on an exterior surface of the drive shaft or rotor.

9. A pump according to claim 4, wherein at least one of the end portions of the flexible shaft is tapered so that the outside diameter is reduced gradually towards the outer end thereof, at least one of the drive shaft end rotor having an end face and a tapered center hole formed in the end face, the tapered end portion being positioned in the tapered center hole and bonded thereto with an adhesive.

10. A pump according to claim 2, wherein a connection between at least one end portion of the flexible shaft and the respective one of the drive shaft and rotor includes a part secured to the end portion by an adhesive and attached to the drive shaft or rotor.

11. A pump according to claim 10, wherein a center hole is formed in an end face of the end portion of the flexible shaft, and the part comprises a metal coupler having an integral protrusion that is inserted in the center hole and is bonded onto an end face of the drive shaft or rotor, which also has a center hole formed in the end face thereof, and end portion of the flexible shaft is positioned, together with the metal coupler, in the center hole of the drive shaft or rotor and bonded thereto with the adhesive.

12. A pump according to claim 10, wherein a center hole is formed in an end face of the drive shaft or rotor, and a keyway is formed in the inner circumference of the center hole, and the part comprises a key positioned in the keyway and bonded by the adhesive onto the outer circumference of the end portion of the flexible shaft, the end portion being inserted into the center hole and bonded thereto with the adhesive.

13. A pump according to claim 10, wherein the part comprises a sleeve-shaped metal coupler integrally secured by bonding with the adhesive, on the end portion of the flexible shaft, a small-diameter protrusion integrally formed on the coupler and inserted in a center hole formed in an end face of the drive shaft or rotor, and a set screw extending perpendicularly to the axis of the center hole and connecting the drive shaft or rotor with the coupler.

14. A pump according to claim 10, wherein the part comprises a sleeve-shaped metal coupler integrally mounted, by bonding with the adhesive, on the end portion of the flexible shaft, the coupler having an internal-threaded portion formed on an internal circumference and removably screwed over an external-threaded portion formed on an exterior surface of the drive shaft or rotor.

15. A pump according to claim 10, wherein at least one of the end portions of the flexible shaft is tapered so that the outside diameter is reduced gradually towards the outer end thereof, at least one of the drive shaft end rotor having an end face and a tapered center hole formed in the end face, the tapered end portion being positioned in the tapered center hole and bonded thereto with an adhesive.

16. A pump according to claim 1, and further comprising a pump casing, a drive unit mounted in the pump casing with the drive shaft extending from one end of the pump casing, and a mechanical seal forming a shaft seal between the drive shaft and the pump casing, the customary window for retightening of the shaft seal being eliminated from the pump casing whereby the length of the drive shaft can be shortened by a distance corresponding to the length of the window.

17. A pump according to claim 16, wherein a connection between at least one end portion of the flexible shaft and the respective one of the drive shaft and rotor includes a part secured to the end portion by an adhesive and attached to the drive shaft or rotor.

18. A pump according to claim 17, wherein a center hole is formed in an end face of the end portion of the flexible shaft, and the part comprises a metal coupler having an integral protrusion that is inserted in the center hole and is bonded onto an end face of the drive shaft or rotor, which also has a center hole formed in the end face thereof, and end portion of the flexible shaft is positioned, together with the metal coupler, in the center hole of the drive shaft or rotor and bonded thereto with the adhesive.

19. A pump according to claim 17, wherein a center hole is formed in an end face of the drive shaft or rotor, and a keyway is formed in the inner circumference of the center hole, and the part comprises a key positioned in the keyway and bonded by the adhesive onto the outer circumference of the end portion of the flexible shaft, the end portion being inserted into the center hole and bonded thereto with the adhesive.

20. A pump according to claim 17, wherein the part comprises a sleeve-shaped metal coupler integrally secured by bonding with the adhesive, on the end portion of the flexible shaft, a small-diameter protrusion integrally formed on the coupler and inserted in a center hole formed in an end face of the drive shaft or rotor, and a set screw extending perpendicularly to the axis of the center hole and connecting the drive shaft or rotor with the coupler.

21. A pump according to claim 17, wherein the part comprises a sleeve-shaped metal coupler integrally mounted, by bonding with the adhesive, on the end portion of the flexible shaft, the coupler having an internal-threaded portion formed on an internal circumference and removably screwed over an external-threaded portion formed on an exterior surface of the drive shaft or rotor.

22. A pump according to claim 17, wherein at least one of the end portions of the flexible shaft is tapered so that the outside diameter is reduced gradually towards the outer end thereof, at least one of the drive shaft end rotor having an end face and a tapered center hole formed in the end face, the tapered end portion being positioned in the tapered center hole and bonded thereto with an adhesive.

23. A pump according to claim 1, wherein a connection between at least one end portion of the flexible shaft and the respective one of the drive shaft and rotor includes a part secured to the end portion by an adhesive and attached to the drive shaft or rotor.

24. A pump according to claim 23, wherein a center hole is formed in an end face of the end portion of the flexible shaft, and the part comprises a metal coupler having an integral protrusion that is inserted in the center hole and is bonded onto an end face of the drive shaft or rotor, which also has a center hole formed in the end face thereof, and end portion of the flexible shaft is positioned, together with the metal coupler, in the center hole of the drive shaft or rotor and bonded thereto with the adhesive.

25. A pump according to claim 23, wherein a center hole is formed in an end face of the drive shaft or rotor, and a keyway is formed in the inner circumference of the center hole, and the part comprises a key positioned in the keyway and bonded by the adhesive onto the outer circumference of the end portion of the flexible shaft, the end portion being inserted into the center hole and bonded thereto with the adhesive.

26. A pump according to claim 23, wherein the part comprises a sleeve-shaped metal coupler integrally secured by bonding with the adhesive, on the end portion of the flexible shaft, a small-diameter protrusion integrally formed on the coupler and inserted in a center hole formed in an end face of the drive shaft or rotor, and a set screw extending perpendicularly to the axis of the center hole and connecting the drive shaft or rotor with the coupler.

27. A pump according to claim 23, wherein the part comprises a sleeve-shaped metal coupler integrally mounted, by bonding with the adhesive, on the end portion of the flexible shaft, the coupler having an internal-threaded portion formed on an internal circumference and removably screwed over an external-threaded portion formed on an exterior surface of the drive shaft or rotor.

28. A pump according to claim 23, wherein at least one of the end portions of the flexible shaft is tapered so that the outside diameter is reduced gradually towards the outer end thereof, at least one of the drive shaft end rotor having an end face and a tapered center hole formed in the end face, the tapered end portion being positioned in the tapered center hole and bonded thereto with an adhesive.

29. A pump according to claim 1, wherein the engineering plastic is PEEK.

30. A pump according to claim 1, wherein the center hole on one end of the drive shaft and rotor is on a part that is releasable secured to the rest of the drive shaft or rotor.

* * * * *